United States Patent
Fujita-Yuhas

(10) Patent No.: US 7,885,392 B2
(45) Date of Patent: Feb. 8, 2011

(54) METHOD AND APPARATUS FOR ENHANCED VOICE MESSAGE ADDRESSING AND PLAYBACK VIA A PHONE INTERFACE

(75) Inventor: Timothy Joseph Fujita-Yuhas, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 1086 days.

(21) Appl. No.: 11/281,017

(22) Filed: Nov. 16, 2005

(65) Prior Publication Data

US 2007/0116198 A1    May 24, 2007

(51) Int. Cl.
*H04M 1/64* (2006.01)
(52) U.S. Cl. ............... 379/88.25; 379/88.17; 379/88.12; 455/413
(58) Field of Classification Search ................. 455/413; 379/88.13, 88.25, 88.17
See application file for complete search history.

(56) References Cited

U.S. PATENT DOCUMENTS

| | | | |
|---|---|---|---|
| 6,385,306 B1 * | 5/2002 | Baxter, Jr. | 379/88.13 |
| 6,430,177 B1 * | 8/2002 | Luzeski et al. | 370/356 |
| 6,438,217 B1 * | 8/2002 | Huna | 379/88.14 |
| 6,445,694 B1 * | 9/2002 | Swartz | 370/352 |
| 6,549,767 B1 * | 4/2003 | Kawashima | 455/412.2 |
| 6,871,215 B2 * | 3/2005 | Smith et al. | 709/206 |
| 6,950,502 B1 * | 9/2005 | Jenkins | 379/88.12 |
| 7,035,666 B2 * | 4/2006 | Silberfenig et al. | 455/556.1 |
| 7,444,375 B2 * | 10/2008 | McConnell et al. | 709/206 |
| 7,457,398 B2 * | 11/2008 | Candell et al. | 379/88.23 |
| 2004/0096043 A1 | 5/2004 | Timmins et al. | |

FOREIGN PATENT DOCUMENTS

| | | | |
|---|---|---|---|
| WO | 00/45573 A1 | 8/2000 | |
| WO | 00/59196 A1 | 10/2000 | |

OTHER PUBLICATIONS

PCT/US2006/031813 International Search Report for corresponding U.S. Appl. No. 11/281,017, dated Nov. 21, 2006, pp. 2 & 3.

* cited by examiner

*Primary Examiner*—Simon Sing
(74) *Attorney, Agent, or Firm*—Brinks Hofer Gilson & Lione

(57) ABSTRACT

Systems and methods for delivering voicemail messages to multiple recipients are disclosed. A system is provided that allows users of voicemail systems to record a voicemail or video message and select multiple recipients to receive the message. The sender may designate a delivery method though a paradigm similar to email systems where recipients may be copied or blind-copied. Recipients of the voicemail message may be made aware of other recipients of the voicemail message, and are made aware of the expectations of the sender.

26 Claims, 4 Drawing Sheets

METHOD AND APPARATUS FOR ENHANCED VOICE MESSAGE ADDRESSING AND PLAYBACK VIA A PHONE INTERFACE

BACKGROUND

1. Field of the Disclosure

The disclosure relates generally to voice and video messaging systems.

2. The Prior Art

Background

Many people rely on voice messaging via the telephone user interface as their primary means of communications with groups of users even with the proliferation of email and other text-based service. Business persons who travel frequently, such as sales personnel or executives are examples of users who may communicate with many members of their enterprise almost exclusively through voicemail. Often, their primary interface to the voicemail system may be the keypad of their mobile handset.

In the paradigm of email, copying others, delegating tasks, and other functions are made easy using the "CC:" or "BCC:" fields of the email interface. However, in the context of a telephone keypad-based interface, distribution of voicemail messages to multiple recipients becomes a more challenging task. Typically, when a message is to be sent to multiple recipients, the sender must verbally identify which recipients are expected to take action on the message and which were included on the message for their interest or awareness.

BRIEF DESCRIPTION OF THE DRAWING FIGURES

DETAILED DESCRIPTION

Figure 1:
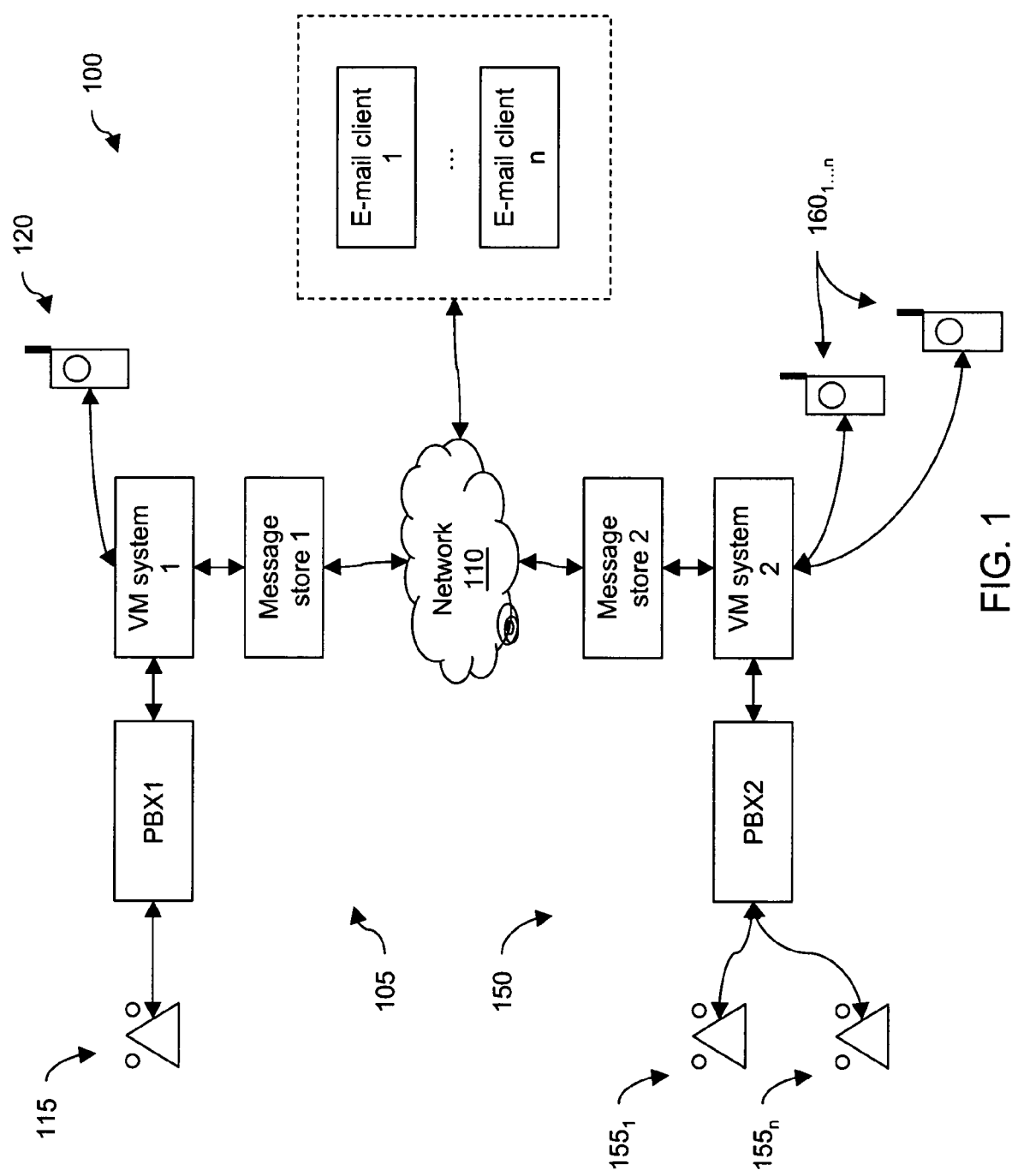
FIG. 1 is a conceptual block diagram of an enhanced voice mail system configured in accordance with this disclosure.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein.

Accordingly, the representation of various aspects of the present disclosure through the use of flowcharts should not be used to limit the scope of the present disclosure.

The present disclosure provides for presenting to the composer of a voice message addressing fields traditionally used in e-mail messaging systems via the telephone user interface. For the benefit of the copied recipients, the sender is able to associate a specific meaning to a class of recipients that have been copied via a particular address field. For example, recipients may be addressed such that copied messages arrives with a designation that indicates "No Reply Necessary" or "For Your Interest Only" etc. Similarly, a blind copied recipient indicates that the sender desires that you are aware of this information but "please don't disclose this information" or "use this information with discretion". The disclosed system provides that these contextual meanings can be played by the receiving voice messaging system as one or more voice prompts that the recipient hears spoken back via the telephone user interface.

The disclosed messaging system provides for users to change the contextual meaning of the message that they are sending to multiple recipients through the telephone user interface of the voice messaging system. Users can send a single message that is addressed to one group of recipients, but copy another group of recipients, and possibly blind copy a third group of recipients.

These contextual meanings for the CC: and BCC: list of recipients may be defined on a system-wide basis such that when the recipient accesses the message, they have explicit notification of the sender's intent, i.e., why they are receiving the message and/or what actions are expected of them.

In addition, the present disclosure provides that the To: and CC: recipients may be able to access the message envelope header information to learn which other recipients were addressed to the message and what addressing field was used. BCC: recipients would have that same knowledge, but the TO: and CC: recipients are not aware of any BCC recipients.

The present disclosure thus saves time and increases the productivity of voice mail users as well as reducing confusion for recipients regarding the voice message addressing intent of the sender when multiple recipients receive voice mails through the enterprise's telephone user interface.

FIG. 1 is a conceptual system diagram of a messaging system 100 configured in accordance with the teachings of this disclosure. The system 100 illustrates an enterprise system including two voice mail systems 105 and 150 communicating through a network 110. Typically, users of the voice mail system may access messages using a variety of devices.

FIG. 1 shows one example of the many ways user may interact with the voicemail system 100. Plain Old Telephone System (POTS) telephone 115 may access the system through PBX exchange 1. The PBX 1 may be coupled to the voicemail system 1 servers, which can then access messages stored in the voicemail system's message store 1 facility.

Mobile users may access the system through mobile handsets such as cellular telephone 120. It is contemplated that mobile users of this disclosure will utilize the voicemail services of the system 100 rather than the services of the telecommunications provider.

Users of email may also access the system 100. FIG. 1 shows email clients 1 . . . n accessing the system through the network 110.

Many enterprises have employees dispersed in geographically remote locations, and utilize voicemail and other messaging service to allow employees at different locations to all access the same system. FIG. 1 shows the system 150, essentially a mirror of the system 105. POTS telephones $155_{1...n}$ access voicemail system 2 through PBX 2, and mobile users $160_{1...n}$ can access the system as described above.

To provide remote connectivity, the voicemail and store and forward facilities of the two disclosed systems are coupled through the network 110. It is contemplated that secure communications means such as virtual private networks (VPNs) may be employed to allow Internet connectivity between locations. Though two systems are shown being interconnected, it is to be understood that any number of systems or different configurations are possible without departing from the spirit of this disclosure.

The voice mail systems of this disclosure may exchange voice messages through a variety of protocols such as the VPIM standard. It is anticipated that the addressing information for this feature may be storied as part of the message in a format for suitable for encoding and decoding by the respective sending and receiving voice or video messaging systems. In one embodiment, the addresses may be stored as separate lists in a data array that is included in the message such that the receiving system reads and expands that information back into the appropriate To, CC, and BCC client fields.

It is contemplated that the CC and BCC address information of this disclosure may be stored as a message property or attribute such that the receiving voice messaging system may decode and/or interpret the addressing information such that it can readily access and play back that information to the end user at the time that the end user accesses the voice message. In one disclosed embodiment, protocols utilized by the system may be extended to include indications to enable the behavior of this disclosure.

The voice messaging systems configured in accordance with this disclosure may be configured to include information for determining how to route or deliver messages appropriately between systems or amongst intended recipients. Additionally, it is contemplated that the voice messaging systems of this disclosure may leverage e-mail conventions when routing voice messages via an e-mail system in a manner similar to many unified messaging systems where voice mails are routed and distributed as attachments within e-mail systems. The benefits of this disclosure may also apply to video messages in addition to traditional voice messages.

Figure 2:
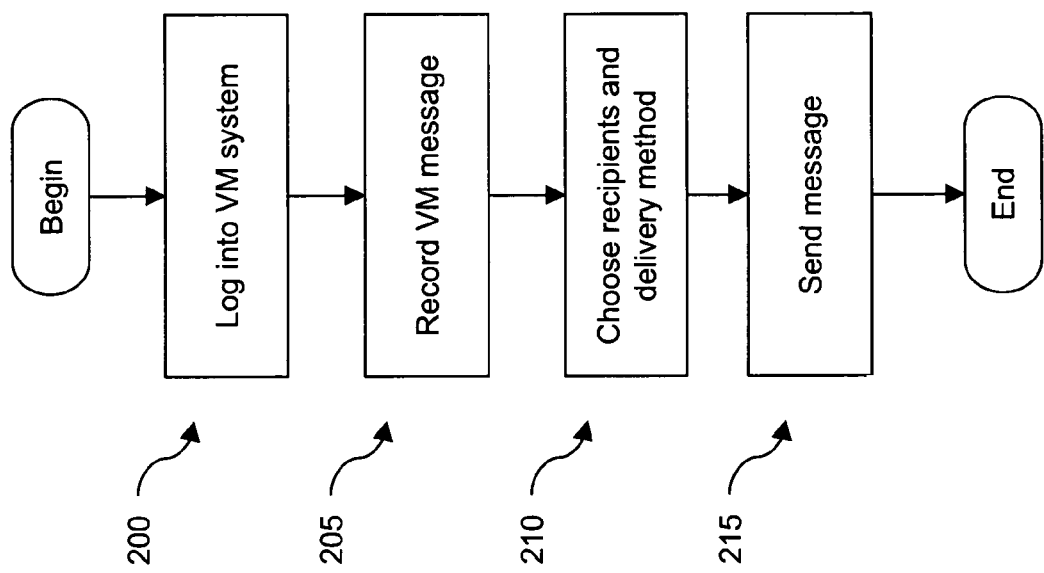
FIG. 2 is a flow diagram of a method for providing enhanced voice mail system configured in accordance with this disclosure.

FIG. 2 is a flow diagram of a method for providing enhanced voice mail messaging capabilities in accordance with the teachings of this disclosure. The process of FIG. 2 begins in act 200, where a voice mail user logs into their voice mail system. In act 205, the user records a voice mail message.

After the message is recorded, the process moves to act 210, where the user may choose the intended recipients, and choose a delivery method for each recipient. Further embodiments of this process will be more fully disclosed below.

In act 215, the message is delivered to the recipients in the manner designated in act 210.

Figure 3:
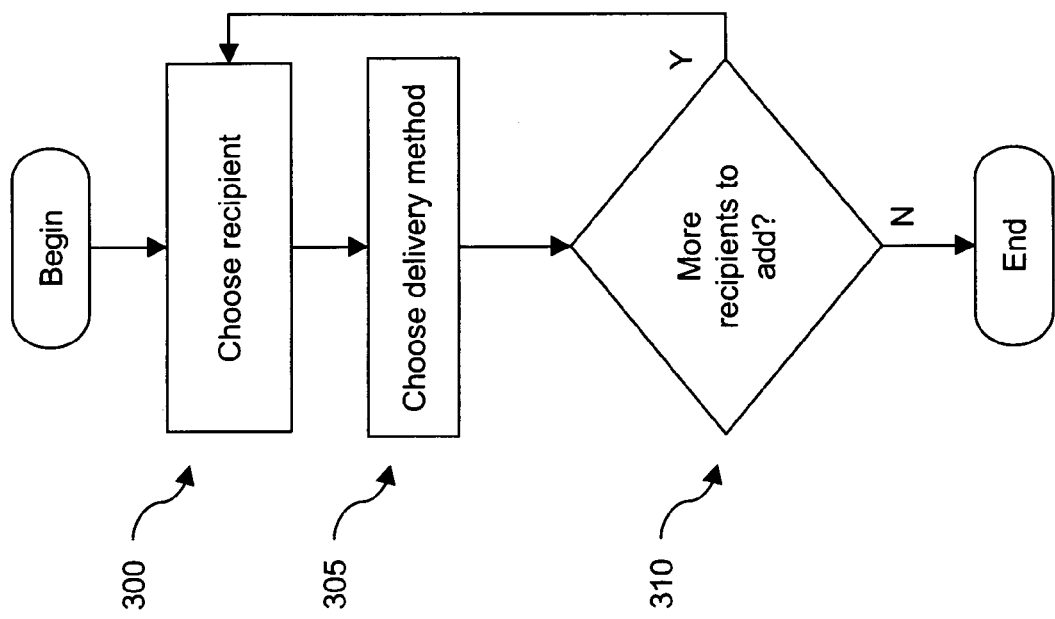
FIG. 3 is a flow diagram of a method for addressing a voice mail message to multiple recipients using an enhanced voice mail system configured in accordance with this disclosure.

FIG. 3 is a flow diagram of a disclosed embodiment of designating multiple recipients and associated delivery method in accordance with the teachings of this disclosure.

It is contemplated that prior to the process of FIG. 3, the user has designated a voice message for distribution and has been authenticated by the voice mail system. In act 300, the user chooses a recipient for the voicemail. It is contemplated that the user may be presented with an audible prompt to enter the extension number of the desired recipient, for example. Alternatively, some systems allow users to record their names for use with their mail box; it is contemplated that in such systems a user may be prompted with these recorded names if available. In a further embodiment, the user may direct the voicemail using the recipient's phone number.

In act 305, the user is prompted to indicate the delivery method. For example, the system may provide an audible prompt such as "To copy the recipient, press 1. To blind copy the recipient, press 2."

In query 310, the system prompts the user as to whether any further recipients are desired to be added. It is contemplated that an audible prompt may be provided to the user, such as "To add more recipients of this message, press 1. To send the message, press 2." If the user desires to add more recipients, the process returns to act 300, where another recipient may be chosen. If the voicemail system provides for distribution lists of recipients, it is contemplated that the user may enter an indication corresponding to a desired distribution list.

Variations on the disclosed methods are contemplated as well. For example, a user may indicate the desired delivery method at the outset for a group of recipients, then input the desired recipients.

A further possibility is that the user indicates the people desired to receive a particular message sent to, and then making a second pass at the address list to identify which ones should be on the CC: or BCC: lists, with the system making the assumption that unless indicated otherwise all addresses go on the TO: list.

Additionally, it is contemplated that a user may be able to retrieve a previously recorded VM and re-distribute it. This may be particularly useful in the case of an NDR (Non Delivery Reciept), or when a message doesn't reach the recipient due to the address being wrong, the recipient's mailbox is full, or their system is offline, etc. In this case, the voicemail system may offer the options of resending the message or re-addressing it to other recipients.

The system may also be configured to allow the user to save a voice message, and resend or forward it at a further time. Likewise, users may reply or forward received messages.

As will now be appreciated, it is thus contemplated that the system of this disclosure may be utilized to create, forward, reply or re-send a voice messages. The system may also allow a user to create and distribute a broadcast message, i.e., a one-time voice announcement that users must to listen to before they can access their regular voice messages.

Figure 4:
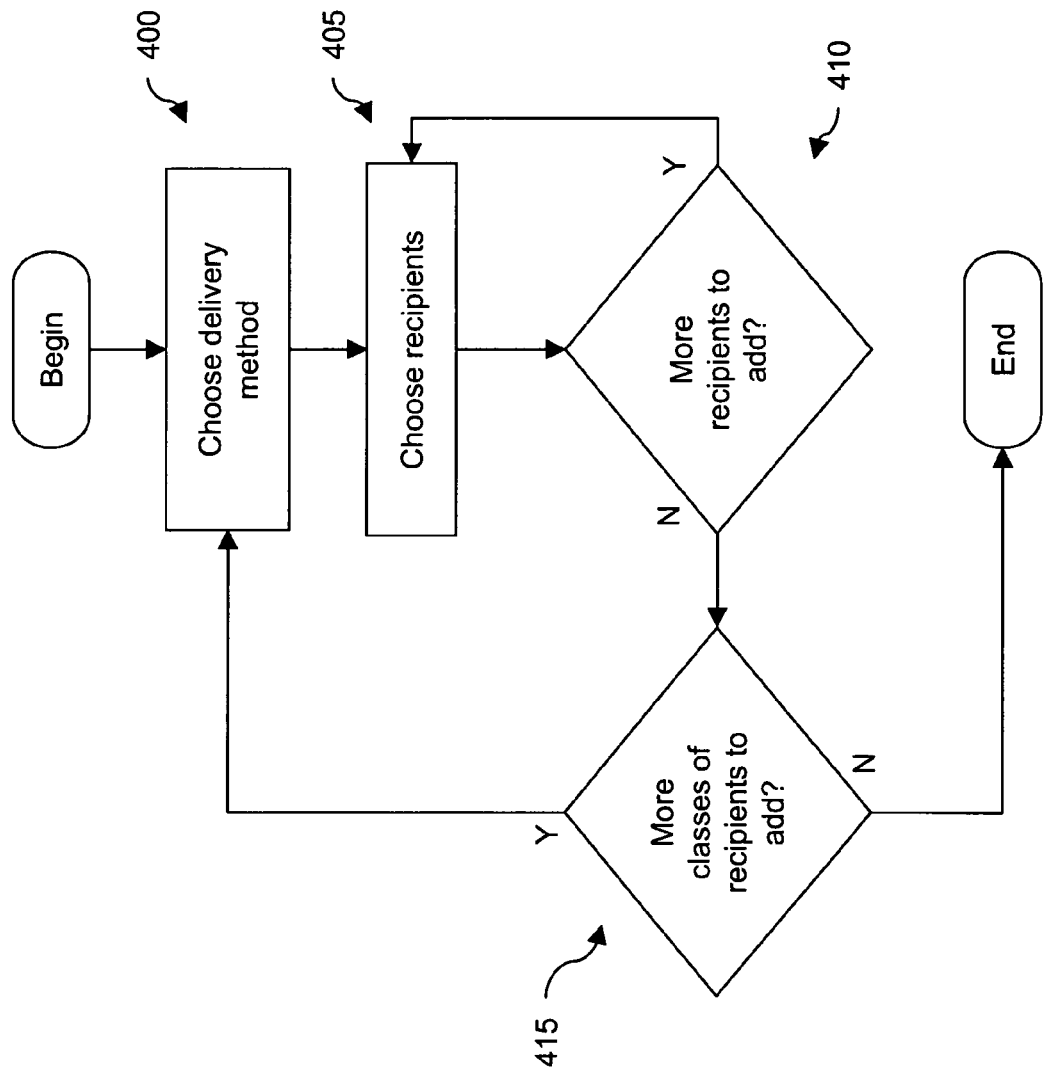
FIG. 4 is a flow diagram of an alternative method for sending a voice mail to multiple recipients in accordance with the teachings of this disclosure.

FIG. 4 is a flow diagram of an alternative method for sending a voice mail to multiple recipients in accordance with the teachings of this disclosure. In this embodiment, it is contemplated that the sender has in mind a group of recipients that share a similar delivery method. The process begins in act 400, where the user first designates a delivery method for the recipients that will be designated in a second step. It is contemplated that the sender may designate a delivery method in any of the ways disclosed above.

After the delivery method has been chosen, the sender may then designate the desired recipients as disclosed above in act 405. The user may enter as many recipients as desired in query 410.

When all the recipients for a particular delivery method has been designated, the user may have the option of indicating that a different delivery method is desired for the message in query 415. If the user desires another delivery method, then the process moves to act 400, where the sender designates another delivery method. The process then operates as described above.

When the sender is done, the sender may indicate in query 415 that no further delivery methods are desired and the process ends.

As the recipients can be grouped in this disclosure by delivery class (i.e., CC:, BCC:), it is contemplated that it may be desirable to allow the sender to include a global voice tag to the message. For example, if a voice message has been designated for delivery to a sales group, the sender may include a voice tag that says "please take this up at your next sales meeting."

Referring now to the delivery of a voice message in accordance with this disclosure from the recipient's point of view, it is contemplated that recipients will experience the received message differently depending on their context. In one embodiment, a header that includes the delivery information of this disclosure is provided. It is contemplated that the header may contain information such as the delivery method for the recipients as designated by the sender, and the list of recipients for each class of delivery. This header may be utilized by the messaging system and/or recipient's handset to determine the behavior of the voice message upon receipt.

For example, if a message is addressed directly to the recipient, it is contemplated that the message will play as a normal voicemail message. Thus, if the recipient hears no copying information, then they can assume they were an intended recipient of the voicemail and are likely expected to take action based on the message.

If others were copied on the message, then in one embodiment the identities of the copied recipients will be played as part of the voicemail as well. This allows the recipient to learn who else has been copied on the message.

If a recipient desires to replay the header information, a header replay option may be provided via asking the system and/or assigned to the keypad to enable the recipient to replay header information at any time. In systems that include name tags for voice boxes as mentioned above, the present system will include the other recipient's name as part of the header information if available. Otherwise, the recipient's extension or phone number can be used.

It is further contemplated that users may selectively mark message attributes for different users. For example, user 1 may have the message marked as urgent, but user 2 has the message marked with normal priority.

As will now be appreciated, a voicemail addressing and delivery system has been disclosed that operates in a manner similar to traditional email systems. Senders can address voicemails in a paradigm familiar to them, and the recipients of the messages are made aware of the sender's expectations.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method for delivering a voicemail message to multiple recipients comprising:
    recording a voicemail message to be delivered;
    selecting a plurality of recipients to receive the voicemail message;
    designating, in response to an audible prompt, a delivery method for each of the recipients thereby indicating how the recipient is to receive the voicemail message; and
    delivering said voicemail message including an audible indication of said delivery method to said plurality of recipients according to said delivery method.

2. The method of claim 1, wherein said delivery method includes at least a copy delivery method or at least a blind copy delivery method, and the audible indication of the delivery method indicates the voicemail message was delivered according to the copy delivery method or the blind copy delivery method.

3. The method of claim 2, wherein designating a delivery method is performed using a touchtone keyboard of a phone.

4. The method of claim 3, further comprising:
    selectively marking messages sent to individual recipients with message attributes.

5. The method of claim 3, wherein the delivery method is selected first, and a plurality of recipients are associated with the delivery method.

6. The method of claim 3, wherein a recipient receives information with a received voicemail message indicating other recipients of said voicemail message who received the voicemail message according to the same delivery method.

7. The method of claim 1, wherein the audible prompt comprises instructions for designating a delivery method.

8. An apparatus for delivering a voicemail message to multiple recipients comprising:
    means for recording the voicemail message to be delivered;
    means for selecting a plurality of recipients to receive the voicemail message;
    means for designating a delivery method for each of the recipients in response to an audible prompt; and
    means for delivering said voicemail message and an audible indication of said delivery method to said plurality of recipients according to said delivery method.

9. The apparatus of claim 8, wherein said delivery method includes at least a copy deliver method or a blind copy delivery method.

10. The apparatus of claim 9, wherein said means for designating a delivery method comprises a touchtone keyboard of a phone.

11. The apparatus of claim 10, further comprising means for selectively marking messages sent to individual recipients with message attributes.

12. The apparatus of claim 10, wherein the delivery method is selected first, and a plurality of recipients are associated with the delivery method.

13. The apparatus of claim 10, wherein a recipient receives information with a received voicemail message indicating other recipients of said voicemail message who received the voicemail message according to the same delivery method.

14. The method of claim 13, wherein recipients of messages according to a blind copy delivery method are not made aware of other blind-copied recipients.

15. An enhanced voicemail system for allowing mobile users to deliver a voicemail message to multiple recipients comprising:
    an enhanced voicemail system including a server and a voicemail store and forward facility;
    at least one mobile handset in communication with the enhanced voicemail system; and
    said enhanced voicemail system being configured to store voicemail messages with an associated addressing information field indicating a delivery method for recipients of the voicemail message as designated by a user of the mobile handset in response to an audible prompt, the addressing information field including an audible indication of said delivery method.

16. The enhanced voicemail system of claim 15, wherein said delivery method includes at least a copy delivery method or a blind copy delivery method designated using a keyboard of said mobile handset.

17. The enhanced voicemail system of claim 16, wherein said enhanced voicemail system is further configured to associate message attributes with said voicemail messages.

18. The enhanced voicemail system of claim 16, wherein the delivery method is selected first, and a plurality of recipients are associated with the delivery method.

19. The enhanced voicemail system of claim 16, wherein a recipient of said voicemail message receives information with a received voicemail message indicating other recipients of said voicemail message who received the voicemail message according to the same delivery method.

20. A computer-readable device for causing a computer to perform a method for delivering a voicemail message to multiple recipients, the method comprising:
  recording a voicemail message to be delivered;
  selecting a plurality of recipients to receive the voicemail message;
  designating, in response to an audible prompt, a delivery method for each of the recipients thereby indicating how the recipient is to receive the voicemail message; and
  delivering said voicemail message including an audible indication of said delivery method to said plurality of recipients according to said delivery method.

21. The device of claim 20, wherein designating a delivery method includes at least a copy delivery method or a blind copy delivery method.

22. The device of claim 21, wherein designating a delivery method is performed using a touchtone keyboard of a phone.

23. The device of claim 21, said method further comprising selectively marking messages sent to individual recipients with message attributes.

24. The device of claim 21, wherein a recipient receives information with a received voicemail message indicating other recipients of said voicemail who received the voicemail according to the same delivery method.

25. The device of claim 24, wherein recipients of messages according to a blind copy delivery method are not made aware of other blind-copied recipients.

26. The device of claim 20, wherein the audible prompt comprises instructions for designating a delivery method.

* * * * *